United States Patent Office 2,918,841
Patented Dec. 29, 1959

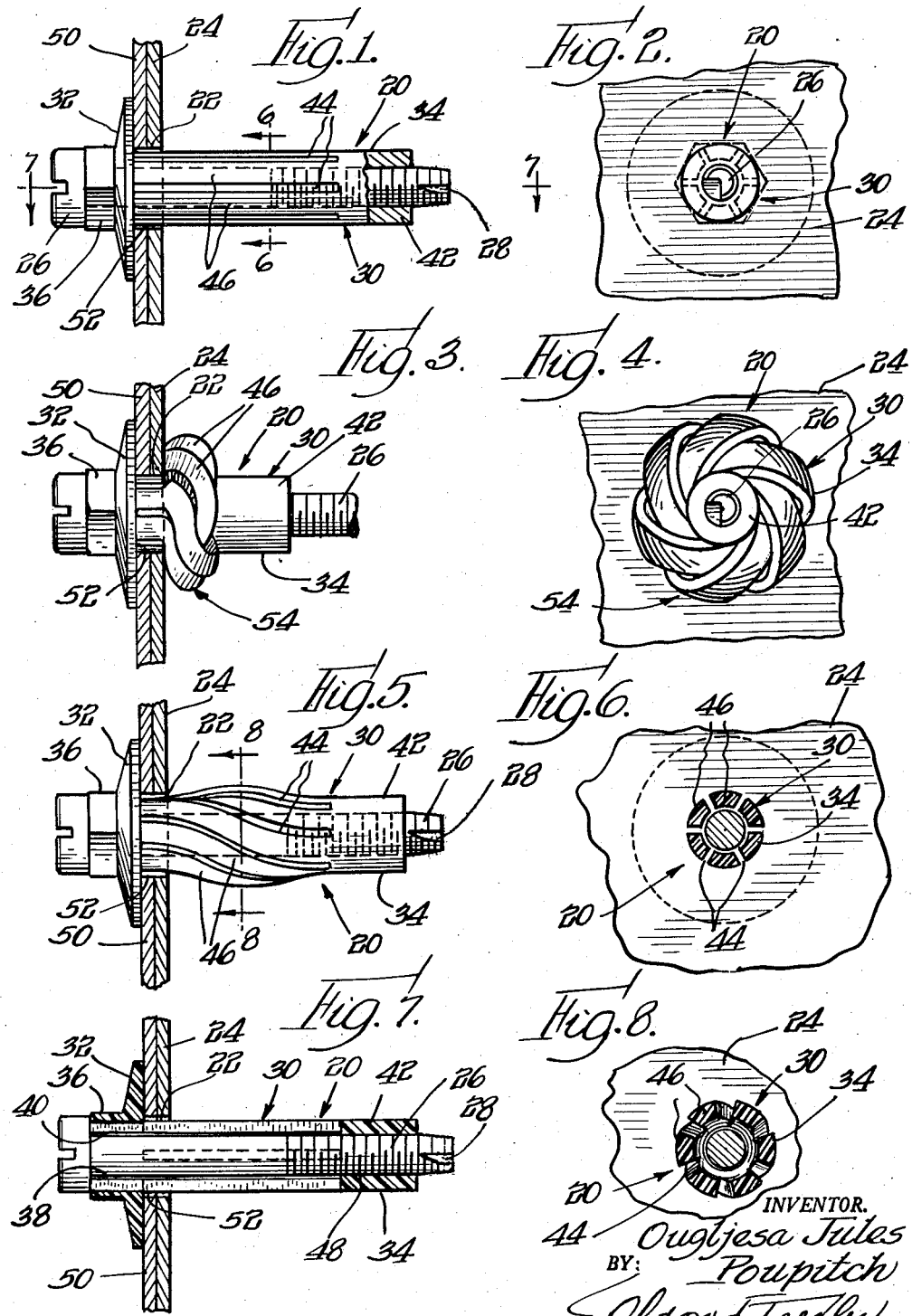

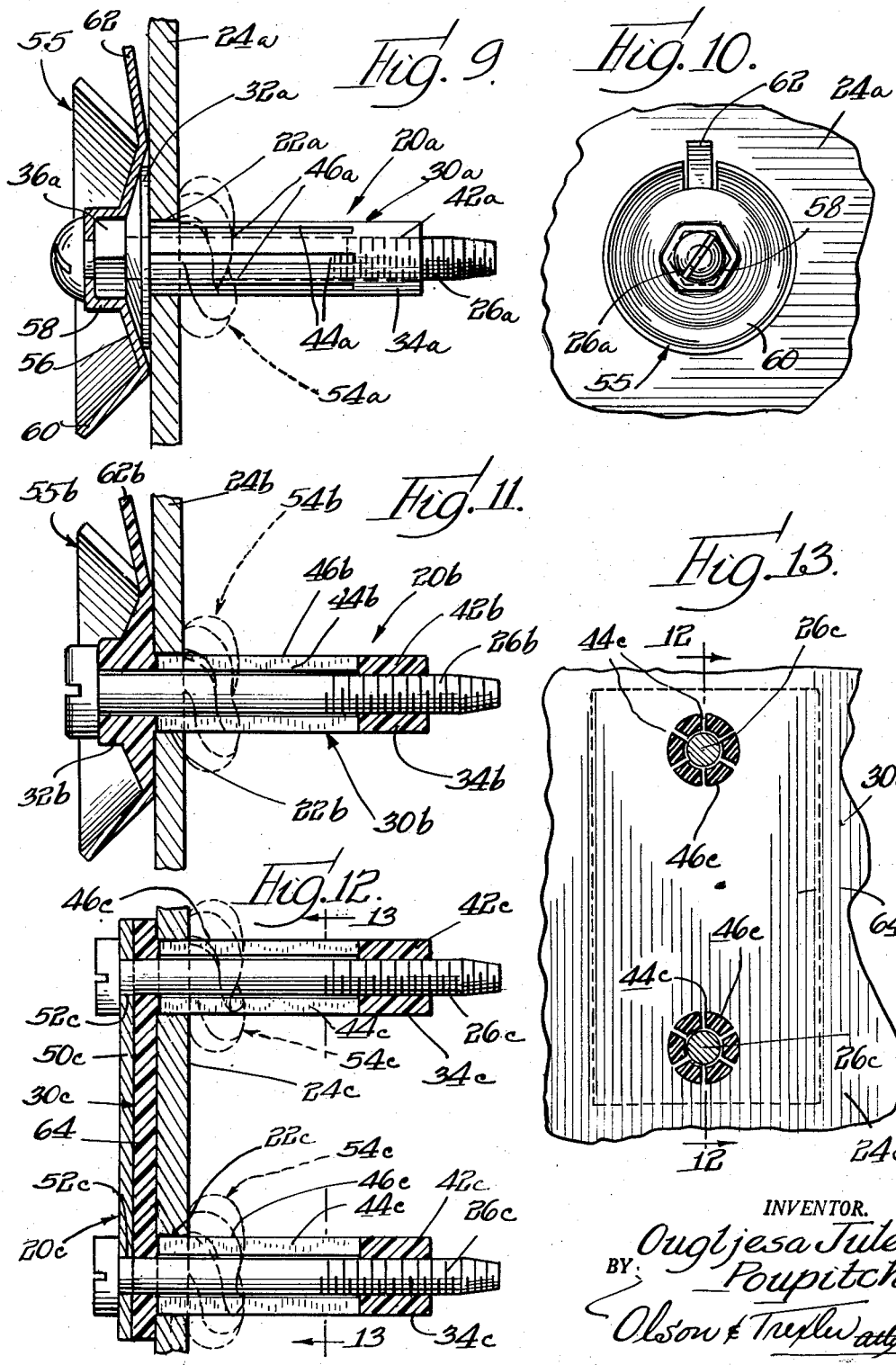

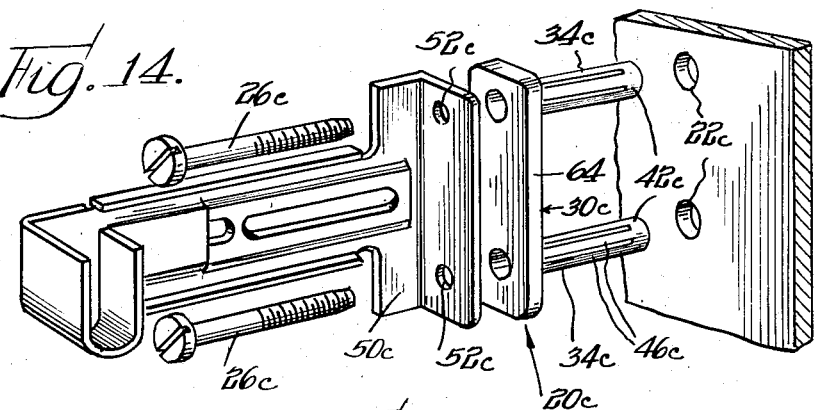
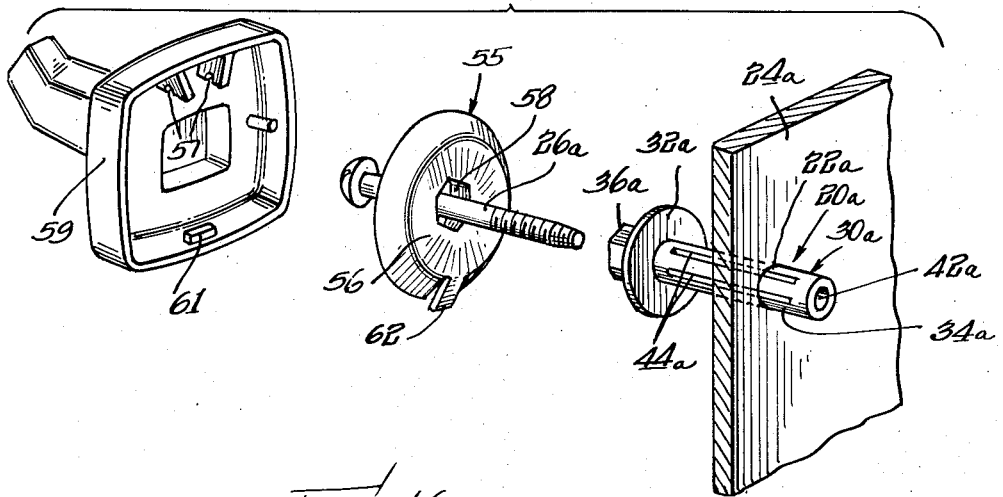
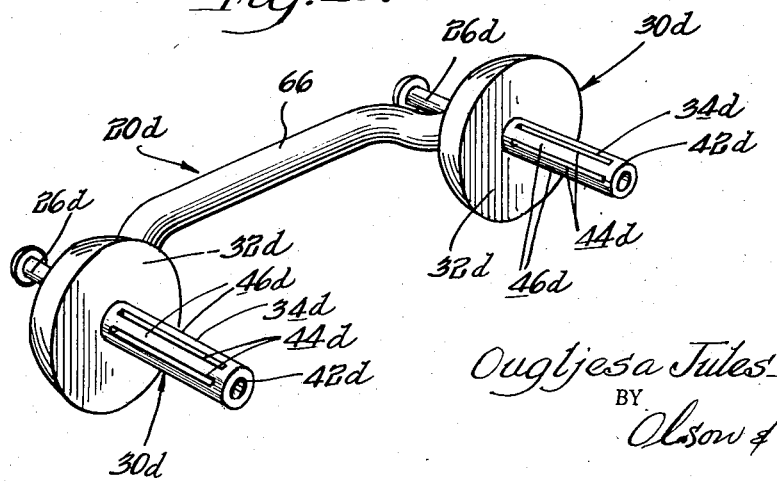

2,918,841

BLIND FASTENER FORMED OF PLASTIC AND CONTAINING LONGITUDINAL SLOTS WHICH PERMIT ROSETTE TYPE OF DISTORTION OF SHANK

Ougljesa Jules Poupitch, Itasca, Ill., assignor to Illinois Tool Works, Chicago, Ill., a corporation of Illinois Application November 1, 1956, Serial No. 619,763

2 Claims. (Cl. 85—40)

This invention is concerned generally with the fastening art, and more particularly with a blind fastener.

As is well known, there are many instances in which it is necessary or desirable to secure a stud type fastener in a wall or the like when the material of the wall itself is not capable of holding the fastener, and when the reverse side of the wall is not accessible for the placing of a nut member or the like on the stud. Accordingly, blind fasteners have been developed. These fasteners, including toggle bolts as a well known example, generally comprise screw threaded studs having fasteners associated therewith, part or all of such fasteners being insertable through an aperture in a wall or the panel, and expanding into the wall or panel, or engageable behind the wall or panel to form a firm anchor for the threaded stud. This invention is concerned with a fastener of this type.

The general object of this invention is to provide an improved blind fastener.

More particularly, it is an object of this invention to provide a blind fastener made of inexpensive and non-critical materials, and of superior holding power.

Specifically, it is an object of this invention to provide a blind fastener affording substantially continuous arcuate contact with the interior or inner surface of a wall or panel.

It is a particular object of this invention to provide a blind fastener having an anchor member made of plastic.

Other and further objects and advantages of the present invention will be apparent from the following description when taken in connection with the accompanying figures wherein:

Fig. 1 is a side view of the invention as it first is inserted in an aperture in a wall or panel or the like;

Fig. 2 is an end view thereof taken from the right end of Fig. 1;

Fig. 3 is a view similar to Fig. 1 following complete installation of the fastener;

Fig. 4 is an end view thereof as taken from the right side of Fig. 3;

Fig. 5 is a side view similar to Figs. 1 and 3, showing the fastener after installation and subsequent loosening;

Fig. 6 is a cross sectional view taken along the line 6—6 in Fig. 1;

Fig. 7 is a longitudinal sectional view as taken substantially along the line 7—7 in Fig. 1;

Fig. 8 is a cross sectional view taken substantially along the line 8—8 in Fig. 5;

Fig. 9 is a side view, partially in section showing a modification of the invention;

Fig. 10 is an end view thereof as taken from the left side of Fig. 9;

Fig. 11 is a longitudinal sectional view of a further modification of the invention;

Fig. 12 is a longitudinal sectional view through a further modification of the invention as taken substantially along the line 12—12 in Fig. 13;

Fig. 13 is a cross sectional view through the last mentioned modified form of the invention as taken substantially along the line 13—13 in Fig. 12;

Fig. 14 is an exploded perspective view of the embodiment of Figs. 12 and 13;

Fig. 15 is an exploded perspective view of an installation utilizing the embodiment of Figs. 9 and 10, the molding clip being inverted, or rotated 180°; and Fig. 16 is a further modification of the invention illustrating a handle formed integral with my novel blind fastener means.

Referring now in greater particularity to the drawings, and first to Figs. 1–8, there will be seen a blind fastener generally designated at 20 inserted in an aperture 22 in wall or panel 24. The blind fastener 20 comprises a self-tapping screw 26 of well known construction, preferably of the type having a tapered, slotted tip 28, and a plastic anchor or retaining device 30. The plastic anchor is made of nylon or polyethylene, or any other suitable plastic material.

The plastic anchor 30 comprises a head 32 and a shank 34. The head preferably comprises a button-like cylindrical flange, and a raised boss 36. The boss 36 preferably is non-circular, such as hexagonal, in order to allow the anchor to be held against rotation by a wrench or the like, or to allow a part to cooperate therewith as hereinafter will be set forth. The head 32 is provided with a cylindrical bore 38 (Fig. 7), and in accordance with one preferred form of the invention the cylindrical bore 38 is provided with inwardly opening longitudinal recesses 40 spaced arcuately about the bore. The recesses facilitate the starting of the screw 26 into the head 32.

The shank 34 is molded integrally with the head 32 and includes a sleeve or collar 42 located at the remote end of the shank relative to the head. Intermediate the sleeve 42 and the head, the shank is provided with arcuately spaced, longitudinal slots 44 forming tough, but resilient strips or ribs 46 lying between them and connecting the head and the sleeve 42. The shank 34 is hollow, and the sleeve 42 thereof is provided with a cylindrical bore 48 which is somewhat smaller in diameter than the screw 26. Accordingly, the screw cuts threads into the bore 48 when the screw is turned into the plastic anchor 30.

As is shown in Figs. 1–8, the blind fastener 20 is used to hold a workpiece 50 against the panel or wall 24. This is done simply by inserting the blind fastener through an aperture 52 in the workpiece aligned with the aperture 22 in the wall or panel, and also inserting the fastener through the aperture 22. Rotation of the screw 26 in the bore 48 of the shank sleeve 42 causes the screw to thread into the sleeve, and to pull the sleeve toward the back side of the wall or panel 24, until eventually the ribs or strips 46 are twisted and pulled up to form substantially a ball 54 abutting the rear face of the wall or panel 24, and comprising a substantially continuous arcuate contact therewith. The plastic material does not tend to cut through the wall or panel 24, as do some metal anchors or stud retainers. However, it will be understood that the plastic material is sufficiently tough that the ribs or strips 46 can be expanded within the material of a wall made of relatively soft material, such as plaster or fiberboard.

Unlike most prior art blind fasteners which are permanently deformed in use, or which have a part that drops behind the wall if the screw is removed, the blind fastener 20 forming the subject matter of this invention is capable of removal and reinsertion. Thus, when the screw, after tightening as in Figs. 3 and 4, is loosened, the inherent resiliency of the plastic material of the anchor 30 causes the shank to return toward its normal shape. More specifically, the shank returns to the shape shown in Figs. 5 and 8, with the ribs or strips 46 somewhat twisted in the direction of the screw 26, and with the mid-portion of the strips bulging slightly outwardly. The strips will cam flat if the anchor 30 is pulled by a pair of pliers or the like, and the anchor thus will snap out of the aperture or hole 22. The panel 50 or the like then can be reinstalled by the same sequence as originally explained.

The holding of a work part such as the panel 50 against a wall or the like is only one function of the blind fastener disclosed herein. The fastener, with some modification, readily can support articles with no parts showing. Specifically, and as shown in Figs. 9 and 10, a molding clip 55 is secured about the head 32a of the blind fastener beneath the head of the screw 26a. The remaining parts of the fastener are similar to those previously described, and are identified by similar numerals with the addition of the suffix a. Accordingly, further description of the fastener is unnecessary. The molding clip 55 comprises a sheet metal stamping having a central section 56 and a boss 58 complementary in shape to the head 32a and boss 36a. The molding clip is provided with a circumferential flange 60 adapted to engage within articles to be held, such as in the notches 57 of the hook or hanger 59 (Fig. 15) and with a radially extending, resilient finger 62, engageable behind a lug 61 within the hollow backside of the hook or hanger 59, or other article. It will be apparent that the molding clip in this instance forms a part of the blind fastener, and the blind fastener is inserted in the same manner heretofore described, whereby the molding clip 55 is held against the wall or panel 24a. In the illustrative example of Fig. 15 the finger 62 projects downwardly, but it could project upwardly as in Figs. 9 and 10. When a suitable article is secured by the molding clip, the molding clip and the screw head and all parts of the blind fastener are hidden from sight.

A further modified form of the invention is shown in Fig. 11. This form of the invention is similar to that shown in Fig. 9, similar parts being identified by similar numerals with the addition of the suffix b. In this instance, the molding clip 55b is molded of plastic integral with the head 32b and shank 34b, and thereby forming an integral part of the blind fastener 20b. As will be understood, the molding clip could take any suitable or convenient form or shape in either of the embodiments in Figs. 9–11. The specific shape shown obviously is only for illustrative purposes.

In some instances, it is desired to secure an article at relatively closely spaced positions. For example, a curtain bracket or the like is generally provided with two relatively closely spaced holes, and such a bracket must in many instances be secured against a plaster wall. An embodiment of the invention adapted for such purposes is shown at 20c in Figs. 12–14, all similar parts being identified with numerals similar to those heretofore used with the addition of the suffix c. More particularly, a single plastic plate or sheet 64 of rectangular shape is provided with a pair of anchor shanks 34c. A pair of studs 26c is respectively threadedly associated with each shank 34c, and the two shanks of the studs 26c are inserted through the apertures 52c of the workpiece 50c (such as curtain bracket) and the shanks of the fastener 20c are inserted through the apertures 22c of the wall or panel 24c. The heads of the studs 26c thus hold the workpiece against the fastener 20c. Mounting of the parts otherwise is similar to that previously described, threading of the screws 26c into the sleeves 42c causing balling of the strips 46c to secure the anchor, and hence the workpiece 50c in place. It will be understood that the shanks 34c could be inserted through the workpiece, but in this case the sheet or panel 64 would show, and this is generally not to be desired.

A further advantage of the embodiment of the invention just described is that the plurality of shanks positively prevents rotation of the anchor during threading of the screw therein. There is no necessity, in this instance, to restrain the fastener from rotating, by means such as a wrench or the like.

A further embodiment of the invention is shown in Fig. 16. This embodiment is similar to that of Figs. 12, 13 and 15 in that two shanks are provided, and numerals similar to those heretofore used are utilized to identify similar parts, this time with the addition of the suffix d. The major difference in the embodiment of Fig. 16 is that the two heads 32d are rounded, and are interconnected by an integral plastic handle 66. The article or fastener 20d thus can be installed wherever it is desired to apply a handle (such as a grab bar adjacent a bathtub or shower) and the rear of the adjacent wall or panel is not readily accessible.

In each form of the invention, the shank of the anchor is twisted and projected laterally into substantially a ball to form a practically continuous surface engagement with the back-side, or inside, of a wall or the like. This provides a firm mounting which does not tend to pull through the wall. The inherent resiliency of the plastic material allows the anchor to spring back to a shape approaching its initial shape when the screw is loosened, thereby allowing the blind fastener and article held thereby to be removed from the wall without dropping a part of the fastener behind the wall, or leaving a part thereof embedded in the wall. Subsequently, the fastener can be reused, as for reinstalling the article previously held thereby. The non-circular section of the head of the fastener allows the anchor to be held by a wrench or the like, so that it will not rotate during insertion. As will be understood, such rotation could cause damage to the wall or the like, or could make it very difficult to turn the screw into the anchor. When a molding clip or the like is included as a part of the anchor, the non-circular part of the anchor head prevents rotation of the molding clip. In the forms of the invention incorporating the molding clip, it will be apparent that, the molding clip itself readily may be grasped by the fingers to prevent rotation of the anchor, and in the form of the invention wherein two shanks are provided on the anchor, the shanks themselves prevent rotation.

It will be understood that the specific examples of the invention herein shown and described are set forth for illustrative purposes only. Various changes in structure will no doubt occur to those skilled in the art, and are to be understood as forming a part of this invention, insofar as they fall within the spirit and scope of the appended claims.

The invention is claimed as follows:

1. A blind fastener device comprising a thread forming stud and a one-piece integral anchor threadedly associated therewith, said anchor being formed of resilient plastic material and including an enlarged head presenting a clamping surface for substantially sealing engagement with a complementary workpiece, said head being provided with a non-circular portion at its end opposite said clamping surface, said head and said non-circular portion thereon having an axial bore and being adapted for installation on one side of the aforementioned apertured wall surface, said anchor further including a shank fixed to said head and adapted to extend into the aperture in said complementary workpiece, said shank comprising a screw receiving portion having a threadless bore at its end remote from said head which is aligned with the bore in said head, and a plurality of longitudinally extending peripherally spaced strips connecting said screw receiving portion with said head, the spaces between said strips extending from the vicinity of said screw receiving portion at least to a plane passing through the clamping surface of said head, the predetermined diameters of said thread forming stud and said screw receiving portion being such that as threads are formed in said screw receiving portion a prevailing torque is present because of the resilience of the plastic material of said anchor to impart torsional forces sufficient to rotate the shank portion of the fastener causing said strips to wrap around the thread forming screw and cause an enlargement of this shank portion as the thread forming portion moves along said threaded stud, said strips impinging behind said complementary wall surface for securing said anchor on the complementary workpiece, the prevailing torque which exists between the thread forming stud and the screw receiving means continuously providing a lock to assure impingement of said collapsed resilient shank portion behind said wall surface in finally mounted position.

2. A blind fastener device of the type set forth in claim 1 wherein the spaces between said strips extend through said head portion and through the non-circular portion associated with said head, both the head and non-circular portion referred to being of a diameter greater than the outer diameter of said shank portion.

References Cited in the file of this patent

UNITED STATES PATENTS

| | | |
|---|---|---|
| 2,150,080 | Rawlings | Mar. 7, 1939 |
| 2,392,133 | Eklund | Jan. 1, 1946 |
| 2,525,736 | Taylor | Oct. 10, 1950 |

FOREIGN PATENTS

| | | |
|---|---|---|
| 151,327 | Great Britain | Sept. 20, 1920 |
| 589,648 | Great Britain | June 26, 1947 |
| 598,730 | Great Britain | Feb. 25, 1948 |
| 832,359 | France | June 27, 1938 |